United States Patent [19]

Schäfer

[11] Patent Number: 4,750,633

[45] Date of Patent: Jun. 14, 1988

[54] STORAGE AND TRANSPORTATION CASE FOR SHELF SYSTEM

[75] Inventor: Gerhard Schäfer, Neunkirchen-Salchendorf, Fed. Rep. of Germany

[73] Assignee: Fritz Schäfer Gesellschaft mit beschränkter Haftung, Neunkirchen, Fed. Rep. of Germany

[21] Appl. No.: 100,338

[22] Filed: Sep. 23, 1987

[30] Foreign Application Priority Data

Sep. 30, 1986 [DE] Fed. Rep. of Germany ....... 3633171

[51] Int. Cl.⁴ ............................................. B65D 85/40
[52] U.S. Cl. ....................................... 220/70; 220/83; 206/599
[58] Field of Search ................... 220/83, 70, 66, 85 K; 206/599, 600, 386

[56] References Cited

U.S. PATENT DOCUMENTS

| | | | |
|---|---|---|---|
| 4,249,671 | 2/1981 | Crolli | 220/83 |
| 4,319,732 | 3/1982 | Godfrey | 206/600 |
| 4,413,737 | 11/1983 | Wind | 206/600 |
| 4,520,941 | 6/1985 | Hagan et al. | 220/83 |
| 4,597,503 | 7/1986 | Lates | 220/83 |

*Primary Examiner*—Joseph Man-Fu Moy
*Attorney, Agent, or Firm*—Toren, McGeady & Associates

[57] ABSTRACT

A storage and transportation case or box for storage systems with automatic feed and removal devices and transport devices and conveying paths associated with the feed and removal devices includes two longitudinal walls and two transverse walls and a bottom so as to form a box-like container. At the bottom the case has support and guide elements for interacting with support and guide rails mounted in the shelf system. On at least one of its transverse walls, the case has on the level of the bottom an engagement member for engaging insertion and extraction members of the feed and removal devices. The bottom, the longitudinal and transverse walls and the engagement member mounted on the outside of the tranverse walls are constructed as a single-piece injection molded article of plastics material. The engagement member for the insertion and extraction members are ledges extending essentially parallel to the transverse walls. The ledges are composed of at least two walls and reinforced by cross-webs. The ledges are supported relative to the transverse walls and toward the corner regions of the transverse and longitudinal walls by means of transverse webs and/or hollow section.

26 Claims, 5 Drawing Sheets

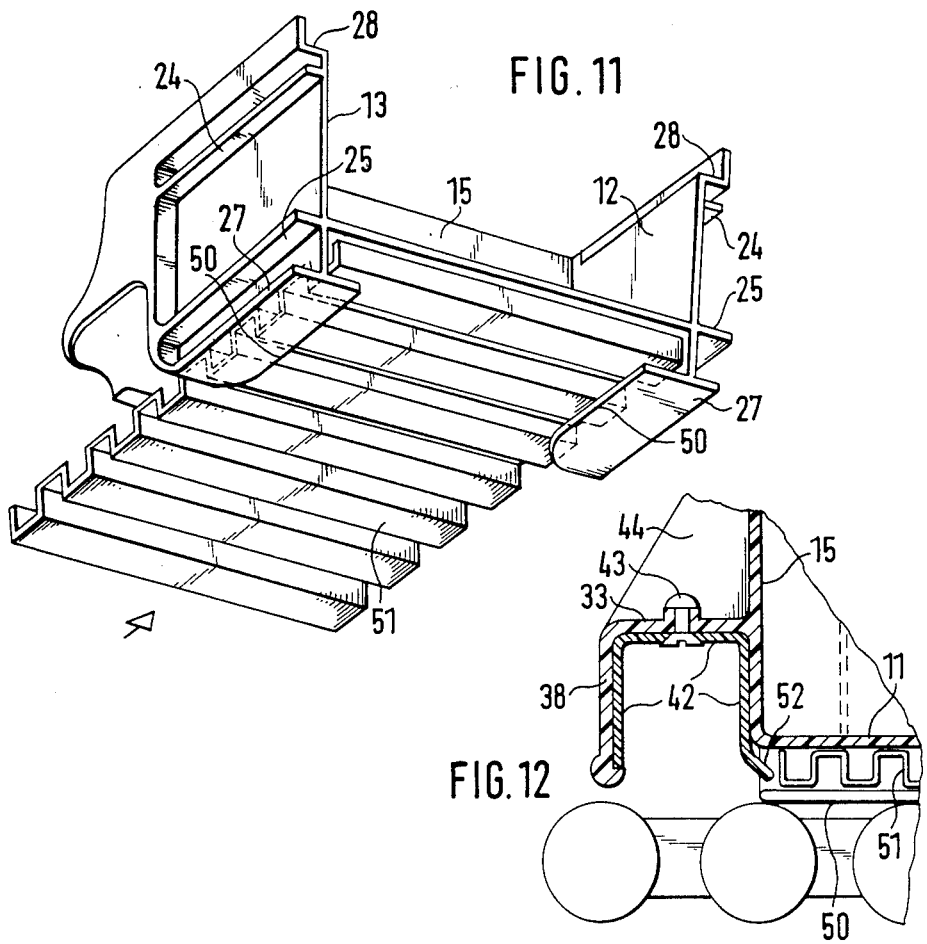
FIG. 11
FIG. 12
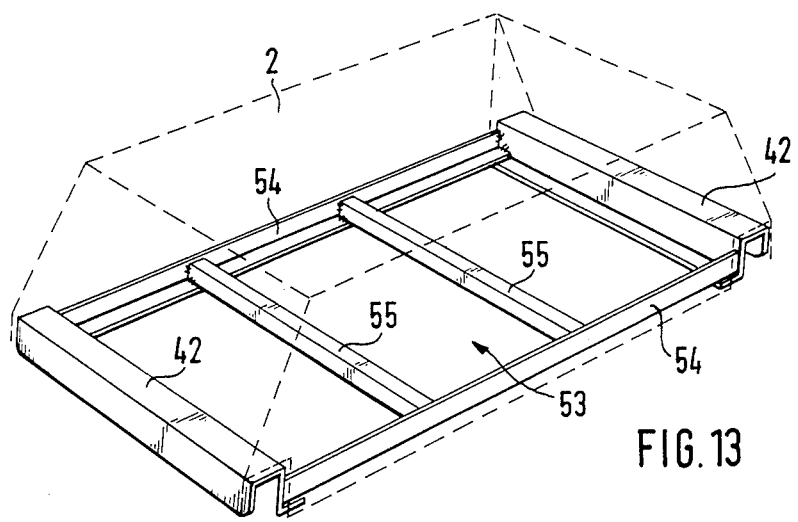
FIG. 13

STORAGE AND TRANSPORTATION CASE FOR SHELF SYSTEM

BACKGROUND OF THE INVENTION

1. Field of the Invention

The present invention relates to a storage and transportation case or box for storage systems with automatic feed and removal devices and transport devices and/or conveying paths associated with the feed and removal devices. Each storage and transportation case includes two longitudinal walls and two transverse walls and a bottom so as to form a box-like container. At the bottom the case has support and guide elements for interacting with support and guide rails mounted in the shelf system. On at least one of its transverse walls, the case has on the level of the bottom an engagement means for engaging insertion and extraction members of the feed and removal devices.

2. Description of the Prior Art

Storage and transportation cases of the above-described type are already known. They are usually made of sheet steel and have longitudinal and transverse walls which are rigidly connected to the bottom. On at least one transverse wall, preferably however on both transverse walls, the known storage and transportation cases are provided on the level of the bottom of width engagement means for engaging the insertion and extraction members of the feed and removal devices. These engagement means are formed by separately manufactured sectional rails which are rigidly welded at least to the transverse wall, preferably however also to the corner regions toward the longitudinal walls and toward the bottom, so that the forces exerted by the extraction members of the feed and removal devices can be securely introduced into the storage and transportation case.

A specific storage and transportation case of this type is disclosed, for example, in German Utility Model 8,326,738. These known storage and transportation cases have the disadvantage that they must be manufactured by initially prefabricating plane sheet steel blanks which are then deformed by means of folding and/or bending procedures and must subsequently be connected to each other by means of complicated welding and/or riveting procedures.

Another deficiency of these known storage and transportation cases is that these cases are subject to corrosion and may generate substantial noise when interacting with the feed and removal devices and the conveyor paths associated with the feed and removal devices.

It is, therefore, the primary object of the present invention to eliminate the disadvantages of the known storage and transportation cases of the above-described type. Specifically, it is the object of the present invention to provide a box-like container forming a storage and transportation case with a structure which can be manufactured even in large numbers with high precision and optimum stability with respect to shape and whose engagement means for the insertion and extraction members of the feed and removal devices are capable of withstanding even high loads for long periods of time.

SUMMARY OF THE INVENTION

In accordance with the present invention, the bottom and the longitudinal and transverse walls of the storage and transportation case described above as well as the engagement means for the insertion and extraction members mounted on the outside of the transverse walls are constructed as a single-piece injection molded article of plastics material. The engagement means for the insertion and extraction members are ledges extending essentially parallel to the transverse walls, the ledges composed of at least two walls and reinforced by cross-webs. The ledges are supported relative to the transverse walls and toward the corner regions of the transverse and longitudinal walls by means of transverse webs and/or hollow sections.

A storage and transportation case constructed in this way meets in an optimum manner the requirements of the above-described object.

In accordance with an advantageous further development of the invention, the ledges are connected so as to extend downwardly from cantilever pieces which project approximately horizontally from the transverse walls. These cantilever pieces are supported toward the transverse walls toward the top and toward the bottom by means of the transverse ribs and/or hollow sections. In this manner, even if the goods contained in the storage and transportation case have a high weight, deformation, damage or even destruction of the engagement means for the insertion and extraction members can be prevented.

In accordance with another feature of the present invention, the hollow sections extend upwardly as well as downwardly beyond the cantilever pieces, while the transverse ribs extend only above these cantilever pieces.

In accordance with another feature of the invention, hollow sections acting as stiffening corner members may be attached to the cantilever pieces so as to extend only upwardly.

To ensure that the insertion and extraction members can be moved in and out laterally, another feature of the present invention provides that the ledges and the cantilever pieces supporting the ledges define at their ends adjacent the longitudinal walls an opening each which extends downwardly and toward the side wall.

Moreover, for reasons of stability, it has been found important to provide the underside of the bottom with lattice-like reinforcing ribs. However, for the same purpose, the bottom may also be supported by mean of a supporting sheet metal which has a uniform wave-like corrugated profile. This corrugated sheet metal rests near its longitudinal edges on inwardly directed cantilevering edges of the longitudinal walls. In addition, it is also possible to support portions of the bottom by means of pipes or section rods which are held at least at their ends in sleeve members which are integrally formed onto the longitudinal walls and to the bottom.

In order to reduce the wear during the interaction of the storage and transportation cases with the insertion and extraction members of the feed and removal devices, it has been found important that the inner surfaces of the cantilever piece and of the ledge as well as the outer surface of the transverse wall located in the region of the ledge are reinforced and protected by a downwardly open metal profile, wherein the edges of the metal profile are embedded in plastics material.

In accordance with another feature of the present invention, the lateral inward and outward movement of the insertion and extraction members of the feed and removal device relative to the engagement means on the storage and transportation case is facilitated by providing the inner surfaces of the ledge with rounded-off portions at the ends adjacent the longitudinal walls.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

BRIEF DESCRIPTION OF THE DRAWING

In the drawing:

FIG. 11 is a partial perspective view and a sectional view of another modification of a storage and transportation case according to the present invention;

FIG. 12 is a partial sectional view of the storage and transportation case illustrated in FIG. 1; and FIG. 13 is a schematic perspective view of a modified stabilized bottom portion of a storage and transportation case according to the present invention.

DETAILED DESCRIPTION OF THE INVENTION

Figure 1:
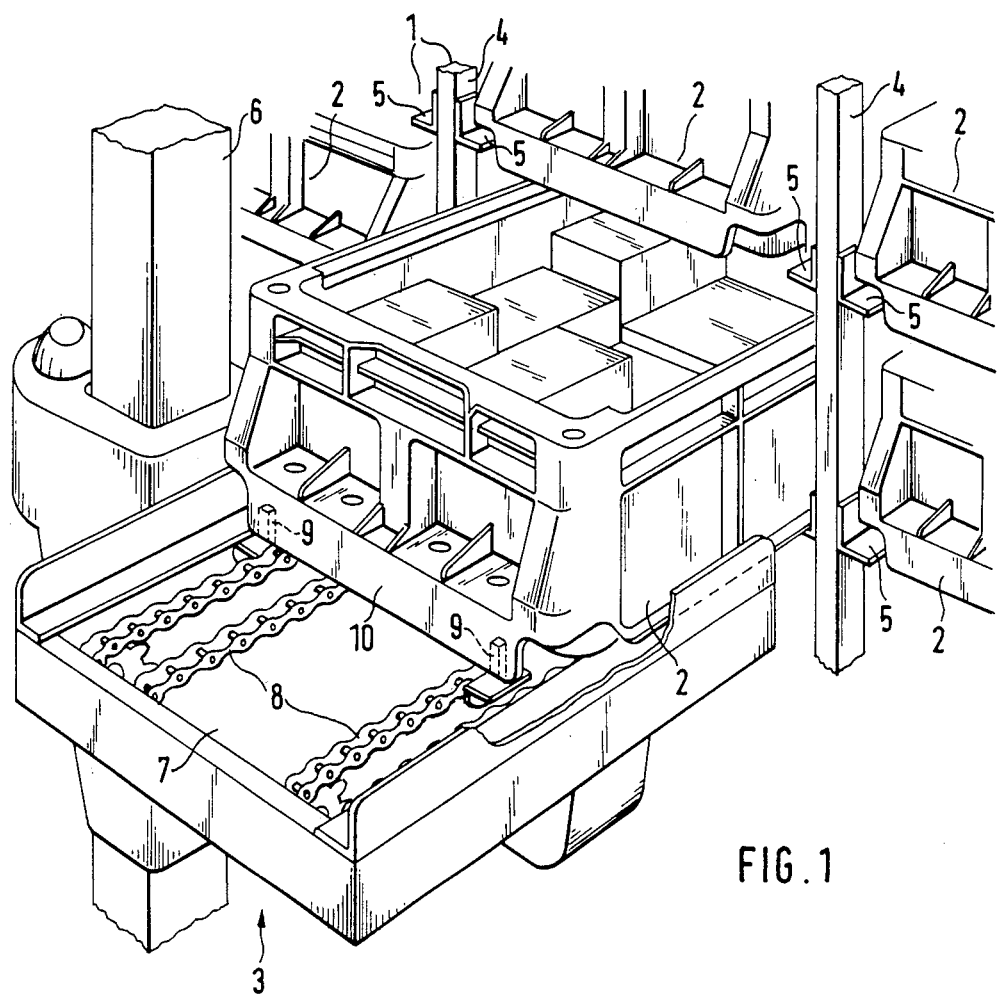
FIG. 1 is a perspective view of a portion of an automatic storage system for small parts and of a feed and removal device associated with the system.

FIG. 1 of the drawing shows a portion of an automatic storage system for small parts which includes at least a shelf system 1 for receiving a plurality of storage and transportation cases 2 and a feed and removal device 3 for individual storage and transportation cases 2.

The shelf system 1 is formed essentially by vertically extending posts 4 and support and guide rails 5 fastened to the posts 4 for the storage and transportation cases 2.

The feed and removal device 3 includes at least a vertical column 6 which can be moved in horizontal direction in the range of the individual shelf sections. Column 6 serves as a guide for a lifting table 7, so that the table 7 can be raised and lowered into the range of the individual shelf compartments. Lifting table 7 includes one or more chain conveyors 8 which serve as insertion and extraction members for individual storage and transportation cases and, for this purpose, each have at least one drive member 9 which can be placed in and out of operative connection with engagement means 10 provided on the storage and transportation cases.

The two chain conveyors 8 shown in FIG. 1 of the drawing are mounted vertically, i.e., the two portions of the chain extend spaced apart one on top of the other. Of course, it is also conceivable to provide chain conveyors 8 on lifting table 7 extending horizontally, so that the two chain portions are arranged spaced apart horizontally next to each other.

Figure 2:
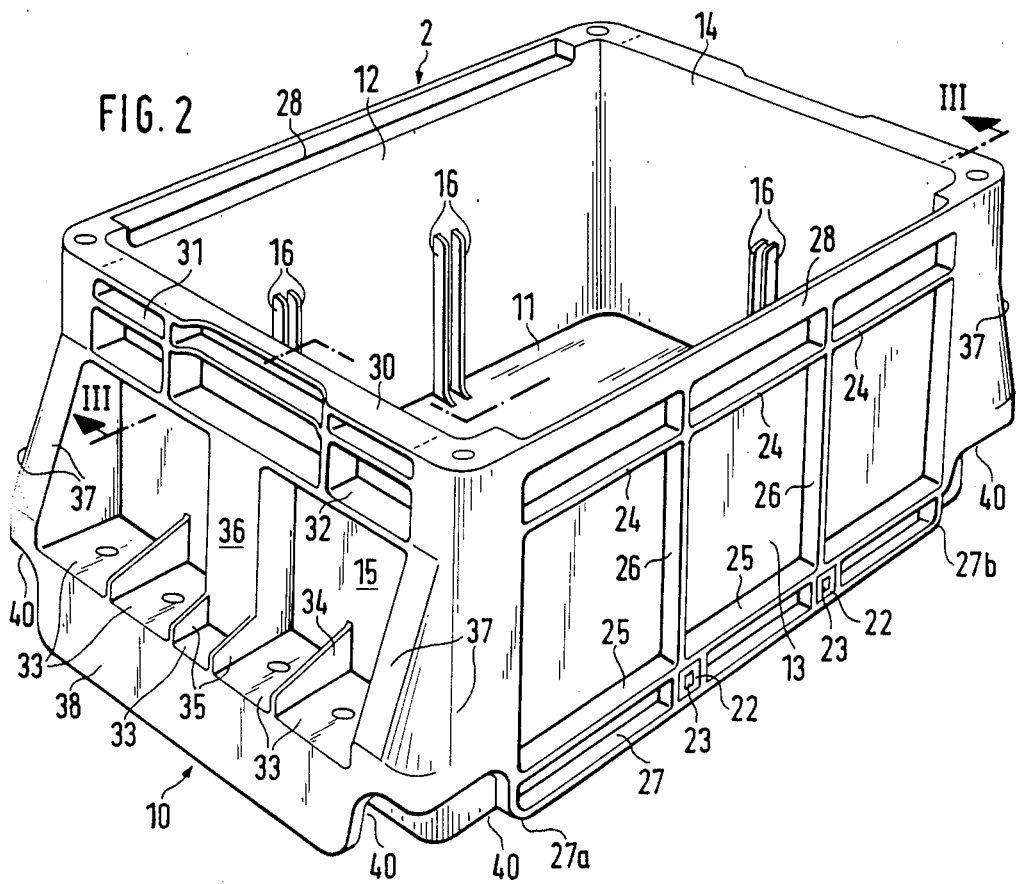
FIG. 2 is a perspective view of a storage and transportation case in accordance with the present invention.
Figure 3:
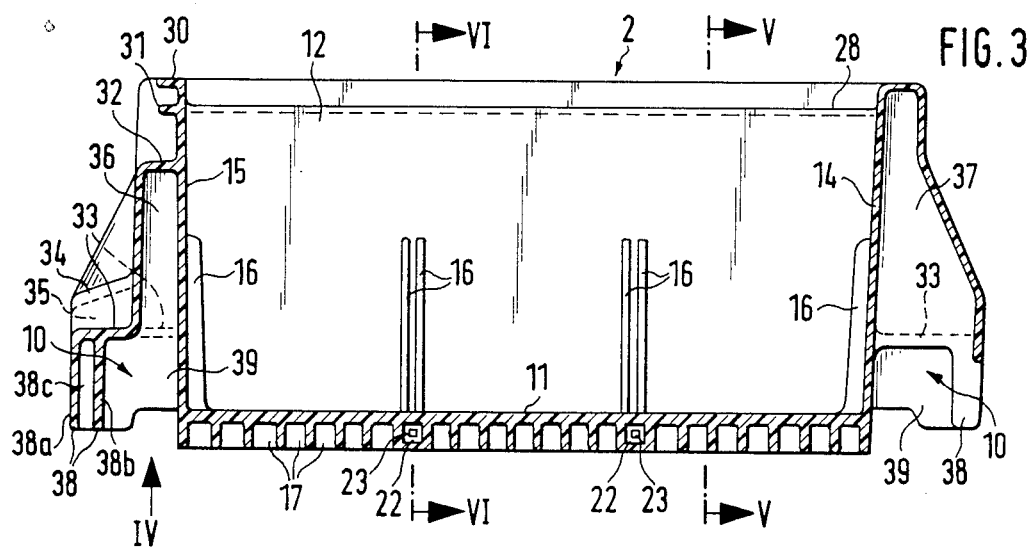
FIG. 3 is a sectional view taken along sectional line III—III of FIG. 2.

FIGS. 2 and 3 of the drawing are a perspective view and a longitudinal sectional view, respectively, of a storage and transportation case 2. Case 2 has a bottom 11 and two longitudinal walls 12 and 13 as well as two transverse walls 14 and 15. The entire storage and transportation case 2 is a one-piece injection molded article of plastics material, i.e., bottom 11, longitudinal walls 12 and 13 and transverse walls 14 and 15 are manufactured in a single work step in an appropriate injection mold. Thus, the storage and transportation cases can be manufactured as box-like containers in large numbers with high precision.

The inner surfaces of bottom 11, of longitudinal walls 12 and 13 and of transverse walls 14 and 15 are essentially smooth and plane. Only storage and transportation cases which are to be divided into several smaller storage sections by means of longitudinally and/or transversely extending separating walls may include upright brackets 16 which are arranged in pairs on the inside of case 2, so that the separating walls can be inserted between the bracket 16 as required.

Figure 4:
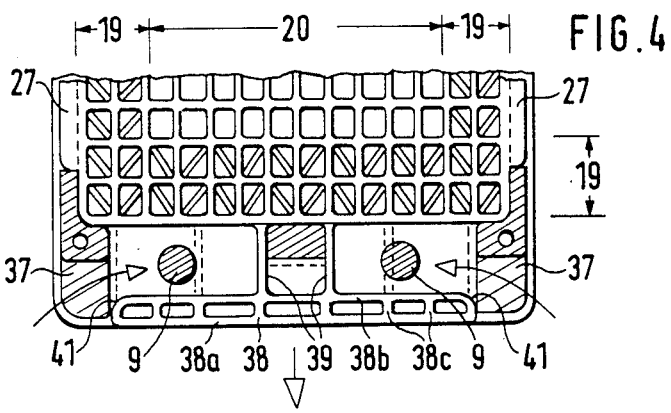
FIG. 4 is a partial view of a storage and transportation case seen in the direction of arrow IV of FIG. 3.
Figure 5:
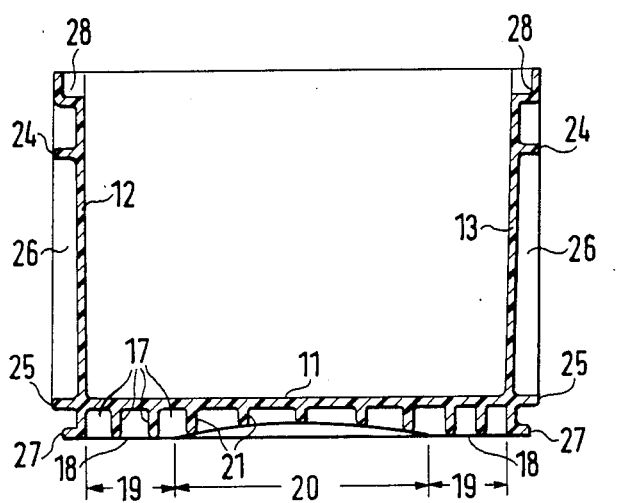
FIG. 5 is a sectional view taken along sectional V—V of FIG. 3.

Bottom 11 may be provided on its underside with reinforcing ribs 17, as can be seen particularly clearly in FIGS. 3 to 5 and 8 and 9. The reinforcing rib may be in the form of a stiffening frame 18 which is mounted adjacent longitudinal walls 12 and 13 and adjacent transverse walls 14 and 15. The ribs of stiffening frame 18 may be provided over a predetermined width 19 with plane-parallel support and/or sliding surfaces located on the same plane, while, in a middle portion 20 adjacent width 19, the bottom of case 2 may be provided with reinforcing ribs 21 whose end surfaces extend along a concavely arched curve, as can be seen in FIG. 5 in a cross-sectional view of a storage and transportation case 2.

In the region of stiffening frame 18 as well as in the region of middle portion 20, the reinforcing ribs 17 and 21 are composed of a lattice formed by upright flat webs. These flat webs of the lattice extend at right angles relative to each other in the stiffening frame 18 as well as in the region of middle portion 20. In addition, diagonal ribs can be provided in the lattice of the stiffening frame 18, as shown, for example, in FIGS. 4, 8 and 9.

Figure 6:
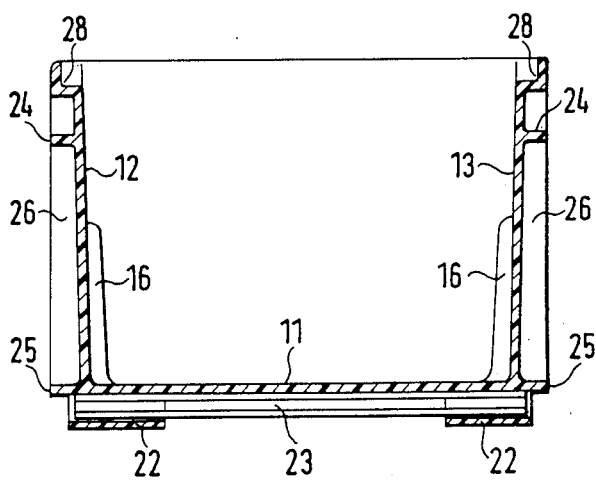
FIG. 6 is a sectional view taken along sectional line VI—VI of FIG. 3.

As FIGS. 2, 3 and 6 further show, additional insertion ducts 22 can additionally be integrally formed into the underside of bottom 11 beyond the level of the reinforcing ribs 17. Insertion ducts 22 have the purpose to receive additional reinforcement sections 23, for example, pipes or section rods, which are inserted transversely of the longitudinal direction of the storage and transportation case 2 and serve to further support bottom 11. As illustrated in FIG. 3, the insertion ducts 22 are sleeve members which are provided in the region of the pairs of upright brackets 16 provided on the inside of the longitudinal walls 12 and 13, so that the reinforcing sections 23 become effective at these locations in a transverse direction of the longitudinal direction of the case 2.

As illustrated in FIGS. 2 and 5 to 7, each storage and transportation case 2 can be provided at the outer surfaces of the two longitudinal walls 12 and 13 with reinforcing ribs 24, 25 and 26, wherein the reinforcing ribs 24 and 25 extend horizontally, while the reinforcing ribs 26 extend in vertical direction.

Each storage and transportation case 2 is additionally provided with outwardly directed horizontal webs 27 mounted underneath bottom 11, i.e., at the bottom edge of the frame 18 formed by reinforcing ribs 17. Webs 27 extend only over a portion of the length of the bottom 11 and of longitudinal walls 12 and 13, as clearly shown in FIG. 2. As also shown in FIG. 2, the end portions 27a and 27b of webs 27 are rounded off toward rib 15.

Figure 7:
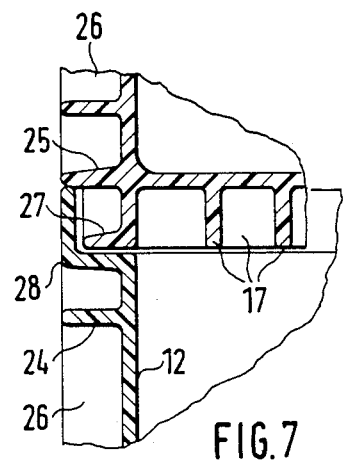
FIG. 7 is a partial sectional view of two storage and transportation cases stacked one immediately above the other.

FIGS. 5 and 7 show that horizontal web 27 has a smaller width than reinforcing rib 25 which extends above and parallel to web 27.

The upper edges of the two longitudinal walls 12 and 13 of each storage and transportation case 2 are formed by outwardly directed angular edges 28. These angular edges 28 extend along a longitudinal portion which coincides with the length of horizontal webs 27 with end portions 27a and 27b.

The angular edges 28 at the upper edges of the two longitudinal walls 12 and 13 form stacking steps for engagement by the horizontal webs 27 of another storage and transportation case 2 stacked above the first case 2, as shown in FIG. 2. Thus, several storage and transportation cases 2 can be stacked one immediately on top of the other. As is clear from the drawing, the distance between the underside of web 27 and the underside of horizontal reinforcing rib 27 is equal to the height of the upright flange of angular edge 28 and, thus, a double support action of the storage and transportation case 2 stacked above is achieved through web 27 and reinforcing rib 25 at angular edge 28. However, the distance between horizontal web 27 and parallel reinforcing rib 25 can be made somewhat greater than the usual cross-sectional height of the prongs of a forklift used for the moving of the storage and transportation cases 2. In this situation, it is further important that the reinforcing rib 25 is supported by vertical reinforcing ribs 26 not only toward the horizontal reinforcing rib 24, but also up to the angular edge 28 at the upper edge of longitudinal walls 12 or 13.

Figure 10:
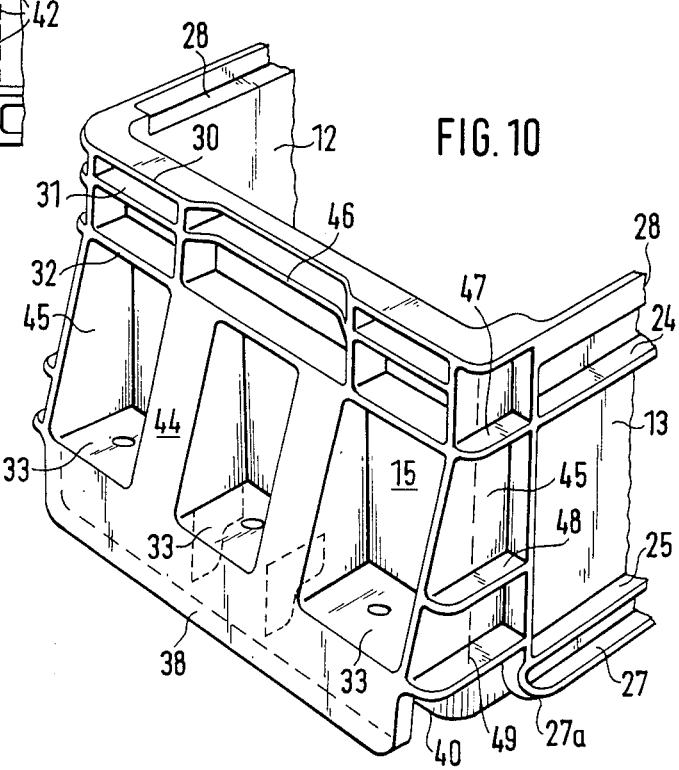
FIG. 10 is a partial perspective view of a somewhat modified storage and transportation case as compared to the case illustrated in FIG. 2.

As can be seen in FIGS. 2, 3 and 10, transverse walls 14 and 15 of each storage and transportation case 2 have at their outsides a plurality of, for example, three, reinforcing ribs 30, 31 and 32 which are arranged spaced apart one on top of the other.

At a substantial distance below the lower reinforcing rib 32, each transverse wall 14 and 15 has attached to it an approximately horizontally projecting cantilever piece 33 which, in the embodiment shown in FIG. 2, is supported relative to transverse walls 14 and 15 by transverse ribs 34 and 35 and by a hollow section 36. For additionally stabilizing each cantilever piece 33, corner members 37 in the form of hollow sections are provided which, as particularly clearly indicated in FIGS. 4, 8 and 9, surround at a certain distance a corner region between a longitudinal wall 12 or 13 and a transverse wall 13 or 15.

A downwardly projecting ledge 38 is attached to each cantilever piece 33. The ledge 38 extends at least approximately over the entire width of transverse walls 14 or 15 and serves as the actual engagement means 10 for the insertion and retraction members, for example, drive members 9, of the feed and removal device 3.

Ledge 38 is either constructed as a very thick-walled member, or ledge 38 is formed by two essentially parallel walls 38a and 38b which are stiffened relative to each other by means of transverse ribs 38c, as clearly illustrated in FIGS. 3, 4 and and 9.

It has been found important in this connection that at least the lateral end walls of hollow section 36 extend downwardly beyond cantilever piece 33, so that the end wall can form additional reinforcing ribs 39 between cantilever piece 33 and ledge 38, as shown in FIG. 4.

As can be seen in FIG. 2, the transition region between the ledge 38 and the hollow sections forming corner members 37 define cut-out portions 40. These cut-out portions 40 are arranged in such a way that the drive members 9 serving as insertion and retraction members of the feed and removal device can be moved from the side without problems behind ledge 38 of engagement means 10, as indicated in FIG. 4 by arrows. Such an inward and outward movement of the insertion and retraction members is necessary, for example, if, contrary to FIG. 1, the chain conveyors 8 are arranged not in a vertical, but in a horizontal plane.

Figure 8:
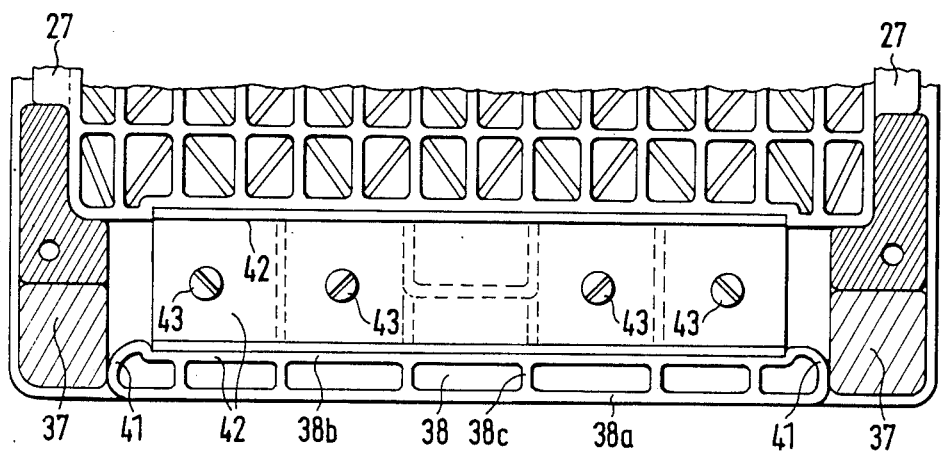
FIG. 8 is a partial view, similar to the view of FIG. 4, showing a modified embodiment of the storage and transportation case according to the present invention.
Figure 9:
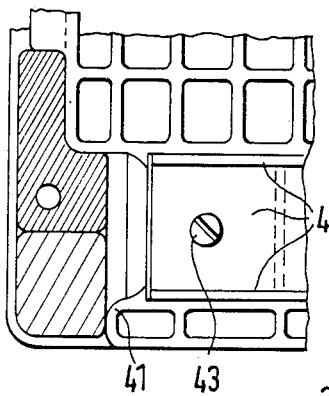
FIG. 9 shows a detail of the left corner portion of the storage and transportation device of FIG. 8.

In order to facilitate in such a case the inward and outward movements of the drive members 9, the end portions of ledges 38 are advantageously provided with rounded-off portions 41, as clearly shown in FIGS. 4, 8 and 9.

Moreover, FIGS. 8, 9 and 12 show that it is advantageous in many cases if the inner surfaces of the cantilever member 33 and of the ledge 38 as well as the outer surfaces of the transverse wall 14 and 15 in the region of ledge 38 are reinforced and protected against wear and/or damage by means of an inserted metal profile 42. The metal profile 42 is preferably a downwardly open U-section. This U-section can be molded into the intended area immediately during the injection molding process. However, the U-section can also be mounted subsequently, for example, by means of screws 43. However, it is always important to arrange metal profile 42 in such a way that its edges are embedded on all sides into the plastics material or are at least mounted flush with the plastics material, so that no cutting edges are exposed.

FIG. 10 of the drawing shows a storage and transportation case 2 whose transverse walls 14 and 15 are somewhat modified as compared to the embodiment shown in FIGS. 2 to 9. In the embodiment of FIG. 10, the cantilevers 33 supporting ledges 38 are stiffened by one or more hollow sections 44 and by ribs 45 toward transverse walls 14 or 15. Ribs 45 are located in the same plane as the two longitudinal walls 12 and 13, while hollow sections 44 are uniformly distributed between ribs 45.

The lateral end walls of the hollow sections 44 also extend beyond the cantilever piece 33, so that they can support ledge 38 additionally toward transverse walls 14 or 15, as is the case in the storage and transportation case 2 illustrated in FIGS. 2 to 9. It should further be mentioned that, in the storage and transportation case 2 according to FIG. 10, a grip opening 46 each is provided in the transverse walls 14 and 15 in the regions between the horizontal reinforcing ribs 31 and 32. Also, ribs 45 can be reinforced in transverse direction by a plurality of horizontal ribs 47, 48, 49.

As is clear from FIGS. 11 and 12, bottom 11 of storage and transportation case 2 does not necessarily have to be stabilized by a lattice of upright flat webs 17 and 21. Rather, it is also possible to form inwardly directed cantilever ledges 50 integrally with the horizontal webs 27 and to insert in longitudinal direction a supporting sheet metal 51 in the space formed between cantilever ledges 50 and the underside of bottom 11. Supporting sheet metal 51 has a transversely directed wave-like or corrugated profile and rests with border edges extending transversely of the wave-like or corrugated profile on cantilever ledges 50. Supporting sheet metal 41 extends underneath bottom 11 in order to stabilize bottom 11.

To ensure that supporting sheet metal 51 does not shift in an undesired manner, it is possible to provide the metal profile 42 mounted in the free space between the cantilever pieces 33, the ledges 38 and the transverse walls 14 or 15 with an extension portion 52 which projects as a safety element into the assembly range of the supporting sheet metal 51 and secures the latter against shifting, as seen in FIG. 12.

Finally, FIG. 13 shows a stiffening frame 53 which can be used for stabilizing the bottom 11 of storage and transportation case 2 if the case 2 is not provided with reinforcing ribs at the underside thereof. This stiffening frame 53 includes two longitudinal members 54 of angular cross-section, two transverse struts 55 connecting longitudinal members 54 and two metal profiles 42 as they are used for stabilizing the cantilever pieces 33 and the ledge 38 at transverse walls 14 and 15 of storage and transportation case 2. Stiffening frame 53 is connected to storage and transportation case 2 exclusively by means of the two metal profiles 42 by means of screws 43, as they are illustrated in FIGS. 8, 9 and 12.

While specific embodiments of the invention have been shown and described in detail to illustrate the application of the inventive principles, it will be understood that the invention may be embodied otherwise without departing from such principles.

I claim:

1. A storage and transportation case for use in storage systems having automatic feed and removal devices and transport devices and conveying paths associated with the feed and removal devices, the storage and transportation case including two longitudinal walls and two transverse walls and a bottom, the bottom of the case adapted for placement on support and guide rails mounted in the shelf system, at least one of the transverse walls having on the level of the bottom an engagement means adapted for engaging insertion and extraction members of the feed and removal devices, wherein the improvement comprises that the bottom and the longitudinal and transverse walls of the storage and transportation case and the engagement means are formed as a single-piece injection molded article of plastics material, the engagement means being mounted on the outside of the transverse walls, the engagement means being ledges extending essentially parallel to the transverse wall, the ledges composed of at least two walls and reinforced by cross-webs, the ledges being supported relative to the transverse walls and toward corner regions formed by the transverse and longitudinal walls by means of transverse webs or hollow sections.

2. The storage and transportation case according to claim 1, wherein the ledges are connected so as to extend downwardly from cantilever pieces which project approximately horizontally from the transverse walls, the cantilever pieces being supported toward the top and toward the bottom by means of the transverse ribs or hollow sections.

3. The storage and transportation case according to claim 2, wherein the hollow sections extend upwardly as well as downwardly beyond the cantilever pieces, and the transverse ribs extend only above the cantilever pieces.

4. The storage and transportation case according to claim 2, wherein the hollow sections are stiffening corner members which extend upwardly from the cantilever pieces.

5. The storage and transportation case according to claim 2, wherein the ledges and the cantilever pieces supporting the ledges define at their end adjacent the longitudinal walls an opening which extends downwardly toward the side.

6. The storage and transportation case according to claim 1, wherein lattice-like reinforcing ribs are provided on the underside of the bottom.

7. The storage and transportation case according to claim 1, wherein a supporting sheet metal is mounted on the underside of the bottom, the sheet metal having a uniform wave-like or corrugated profile, the sheet metal resting near its longitudinal edges on inwardly directed cantilevering edges of the longitudinal walls.

8. The storage and transportation case according to claim 1, wherein pipes or section rods are mounted on the underside of the bottom, the ends of the pipes or section rods being held in sleeve members which are integrally formed onto the longitudinal walls and to the bottom.

9. The storage and transportation case according to claim 2, wherein the cantilever pieces and the ledges have inner surfaces and the transverse walls have outer surfaces, the inner surfaces and the outer surface in the region of the ledges being reinforced and protected by means of a downwardly open metal profile, the edges of the metal profile being embedded in the plastics material.

10. The storage and transportation case according to claim 1, wherein the inner surfaces of the ledges are rounded off at the ends adjacent to the longitudinal walls.

11. The storage and transportation case according to claim 6, wherein a stiffening frame is mounted on the underside of the bottom, the stiffening frame being connected to the longitudinal walls and the transverse walls, the stiffening frame being provided over a predetermined width with plane-parallel support and sliding surfaces located on the same plane, a middle portion adjacent the reinforcing frame having reinforcing ribs whose ends extend along a concavely arched curve.

12. The storage and transportation case according to claim 11, wherein the stiffening frame and the reinforcing ribs are composed of a lattice formed by upright flat ribs.

13. The storage and transportation case according to claim 12, wherein the stiffening frame is formed by additional webs, the additional webs and the webs of the reinforcing ribs of the middle portion extending at right angles relative to each other, and diagonal webs being provided in the lattice of the stiffening frame.

14. The storage and transportation case according to claim 13, wherein the flat webs of the stiffening frame are integrally formed onto the underside of the bottom.

15. The storage and transportation case according to claim 8, wherein the bottom defines insertion openings for receiving the pipes or section rods.

16. The storage and transportation case according to claim 1, wherein the longitudinal walls have spaced from the upper edges at least one horizontally extending first stiffening rib and in the region of the bottom at least two parallel horizontally extending second and third stiffening ribs.

17. The storage and transportation case according to claim 16, wherein the first stiffening ribs have at least the same width as the second stiffening ribs.

18. The storage and transportation case according to claim 17, wherein the longitudinal walls are provided with a plurality of parallel vertically extending fourth stiffening ribs, the fourth stiffening ribs extending along the entire height of the longitudinal walls, the width of the fourth stiffening ribs being at least the same as the width of the first and second stiffening ribs.

19. The storage and transportation case according to claim 18, wherein the transverse walls have at their upper edges outwardly directed fifth stiffening ribs, the fifth stiffening ribs having vertical end faces located approximately in the same plane.

20. The storage and transportation case according to claim 19, wherein at least the longitudinal walls define a stacking step facing inwardly at the upper edges of the longitudinal walls.

21. The storage and transportation case according to claim 20, wherein additional stacking steps are provided in the bottom, the steps in the bottom being formed by outwardly projecting webs, the steps in the longitudinal walls being formed by outwardly projecting angular edges, the steps being capable of engaging one into the other when two cases are placed one on top of the other, the angular edges projecting outwardly by a distance corresponding to the width of the stiffening rib.

22. The storage and transportation case according to claim 21, wherein the bottom surfaces of the second and third stiffening ribs are spaced apart from each other by a distance which is the same as the height of the angular edges.

23. The storage and transportation case according to claim 22, wherein the width of the second stiffening ribs is at least the same as the total width of the angular edges.

24. The storage and transportation case according to claim 23, wherein the spacing between the second and third reinforcing ribs is greater than the cross-sectional height of the prongs of a forklift.

25. The storage and transportation case according to claim 24, wherein the second reinforcing ribs form the upper limit of the stacking step in the bottom.

26. The storage and transportation case according to claim 25, wherein the vertically extending fourth stiffening ribs extend upwardly against the angular edges of the stacking steps of the longitudinal walls.

* * * * *